United States Patent [19]
Taylor

[11] Patent Number: 5,410,120
[45] Date of Patent: Apr. 25, 1995

[54] WELDING ENCLOSURE ASSEMBLY

[75] Inventor: Kenneth D. Taylor, Troy, Mich.

[73] Assignee: Apex Engineering Company, Madison Heights, Mich.

[21] Appl. No.: 84,576

[22] Filed: Jun. 29, 1993

[51] Int. Cl.[6] ............................................... B23K 9/32
[52] U.S. Cl. ................................. 219/72; 219/137 R; 219/137.41; 454/49
[58] Field of Search ................ 219/137 R, 137.41, 72; 454/49, 56, 187; 29/722

[56] References Cited

U.S. PATENT DOCUMENTS

| | | | |
|---|---|---|---|
| 3,473,461 | 10/1969 | Madl, Jr. | 454/49 |
| 3,657,991 | 4/1972 | Oberg | 454/49 |
| 4,297,940 | 11/1981 | Hainline | 454/49 |
| 4,562,791 | 1/1986 | Porter et al. | 118/326 |
| 4,880,581 | 11/1989 | Dastoli et al. | 264/39 |
| 4,890,544 | 1/1990 | Aalto et al. | 454/49 |
| 5,074,198 | 12/1991 | Aalto et al. | 454/191 |
| 5,176,566 | 1/1993 | Crouch | 454/61 |

Primary Examiner—Clifford C. Shaw
Attorney, Agent, or Firm—Young, MacFarlane & Wood

[57] ABSTRACT

A welding enclosure includes a central work chamber; a plurality of horizontally spaced welding work stations within the central work chamber; an exhaust chamber beneath and generally coextensive with the central work chamber; a floor over the exhaust chamber, underlying and substantially coextensive with the central work chamber, and including vents operative to allow air to pass through the floor between the central work chamber and exhaust chamber; an exhaust fan for exhausting air from the exhaust chamber; a blower arranged to establish a positive air pressure in the plenum chamber; and a ceiling over and substantial coextensive with the central work chamber, underlying the plenum chamber, and including air registers operative to pass air downwardly through the ceiling from the plenum into the central work chamber for passage downwardly through the central work chamber and through the floor vents into the exhaust chamber for removal by the exhaust fan. The various parameters of the enclosure assembly are selected to establish a steady substantially laminar downward flow of air over substantially the entire horizontal area of the central work chamber at a velocity sufficient to entrain the welding fumes generated at the plurality of horizontally spaced welding work stations and move the fumes downwardly to the exhaust chamber for exhaust by the exhaust fan.

26 Claims, 4 Drawing Sheets

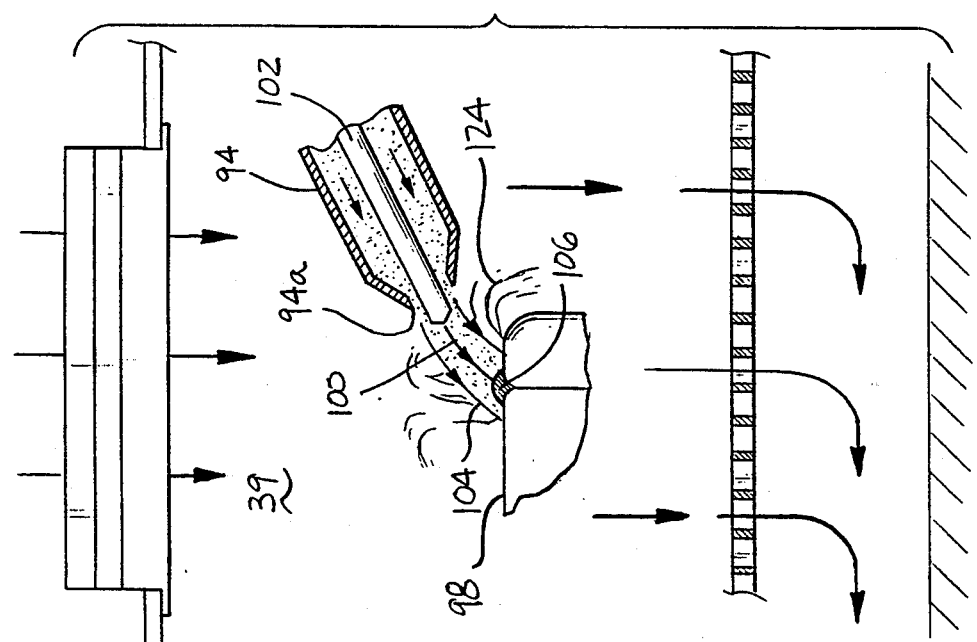
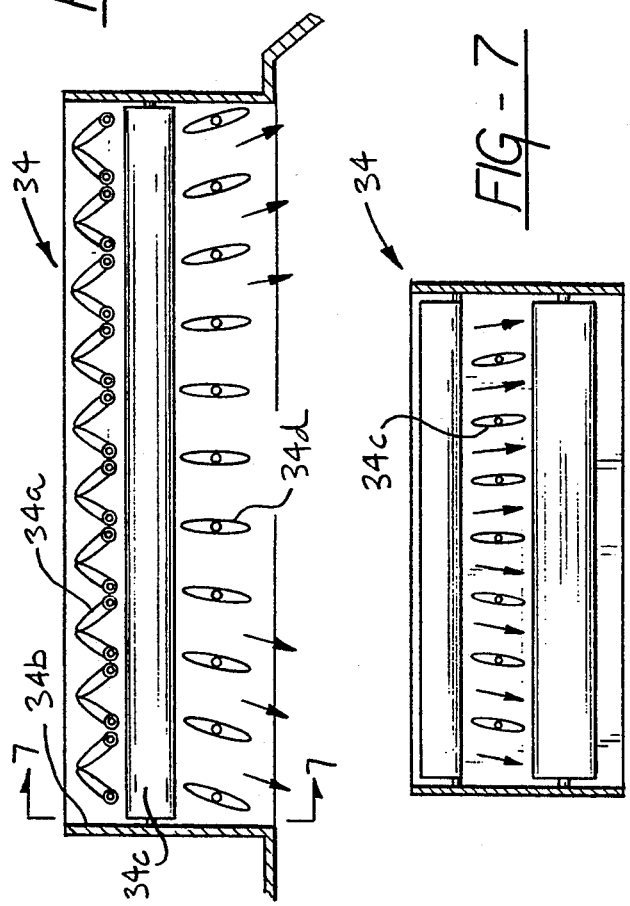
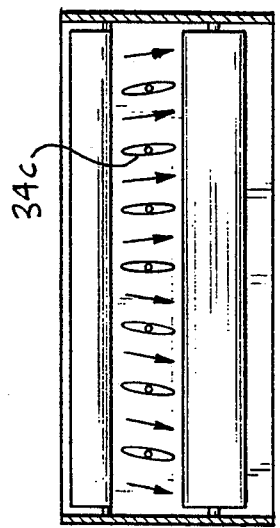
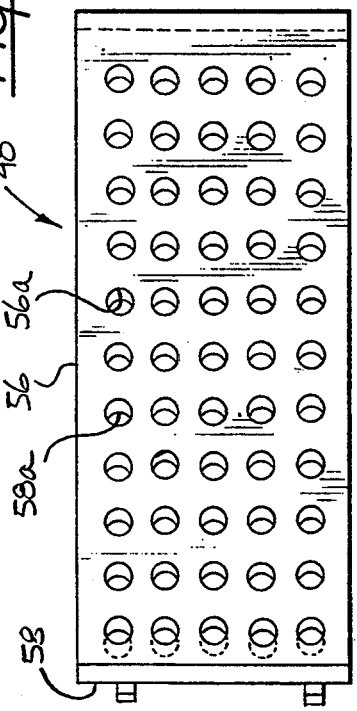

WELDING ENCLOSURE ASSEMBLY

BACKGROUND OF THE INVENTION

This invention relates to welding and more particularly to large scale welding operations.

Welding is widely employed in many industries as a ready and efficient means of positively and permanently joining metallic members to form a composite metallic structure. However, welding operations inherently generate large quantities of welding fumes which pose health problems for the welders. Specifically, even though a welder typically wears a customized protective helmet, the fumes generated at the weld location arise upwardly, enter the helmet, and thereby enter the respiratory and vision zones of the welder. The fumes within the helmet are extremely irritating to the welder, requiring frequent relief periods for the welder with consequent losses in productivity, and further, on a longer time frame, can cause serious illness to the welder. Whereas various attempts have been made in the past to address these irritation and health problems, the prior art attempts have not successfully addressed the fume removal requirements of large scale welding operations.

SUMMARY OF THE INVENTION

This invention is directed to the provision of an improved welding apparatus and methodology.

More specifically, this invention is directed to the provision of a method and apparatus for effectively removing fumes in large scale welding operations.

According to one aspect of the invention, means are provided to establish a welding enclosure having a ceiling overlying the welding operation and a floor underlying the welding operation and having vent means to allow passage of air downwardly through the floor, and means are provided to establish a continuous downward flow of air within the enclosure from the ceiling to the floor at a velocity sufficient to entrain the welding fumes and move the fumes downwardly through the vent means in the floor for exhaust from the enclosure. This arrangement provides an efficient means of removing welding fumes in a large scale welding operation where several welders are welding simultaneously.

More specifically, the invention provides a welding enclosure assembly including a central work chamber; means defining a plurality of horizontally spaced welding work stations within the central work chamber; an exhaust chamber beneath and generally coextensive with the central work chamber; a floor over the exhaust chamber, underlying and substantially coextensive with the central work chamber, and including vent means operative to allow air to pass through the floor between the central work chamber and exhaust chamber; exhaust means for exhausting air from the exhaust chamber; a plenum chamber overlying the central work chamber; means for establishing a positive air pressure in the plenum chamber; and a ceiling over and substantially coextensive with the central work chamber, underlying the plenum chamber, and including vent means operative to pass air downwardly through the ceiling from the plenum chamber into the central work chamber for passage downwardly through the central work chamber through the floor vent means into the exhaust chamber and into the exhaust means.

With this arrangement, the various parameters of the enclosure assembly may be selected to establish a steady substantially laminar downward flow of air over substantially the entire horizontal area of the central work chamber at a velocity sufficient to entrain the welding fumes generated at the plurality of horizontally spaced welding work stations and move the fumes downwardly to the exhaust chamber for exhaust through the exhaust means.

According to a further feature of the invention, the welding enclosure includes peripheral side walls which coact with the floor and the ceiling to define a substantially enclosed central work chamber. This arrangement facilitates the maintenance of the laminar down flow of air over substantially the entire horizontal area of the central work chamber.

According to a further feature of the invention, the means for establishing a positive air pressure in the plenum chamber includes a blower arranged to deliver its output to the plenum and the exhaust means includes an exhaust conduit communicating with the exhaust chamber and an exhaust fan communicating with the exhaust conduit. This arrangement provides a positive push/pull effect to facilitate the laminar down flow of the air through the work chamber at the velocity required to effect fume removal.

In the disclosed embodiment of the invention, the ceiling vent means and the floor vent means are selectively adjustable so as to selectively vary the direction and volume of the air flowing through the chamber to ensure a uniform downward flow of air at the required velocity over substantially the entire chamber horizontal surface area.

The invention also provides a method of removing welding fumes from a welding work area. The invention method comprises the steps of providing a plurality of horizontally spaced welding work stations within the work area; providing peripheral side walls to enclose the work area; providing a ceiling over the work area; providing a plenum chamber over the ceiling; providing a floor under the work area; providing an exhaust chamber under the floor; delivering pressurized air to the plenum chamber; exhausting air from the exhaust chamber; providing vent means in the ceiling and in the floor; and adjusting the vent means, the delivery of pressurized air to the plenum chamber, and the exhausting of air from the exhaust chamber such that air flows downwardly through the work area from the plenum chamber to the exhaust chamber over substantially the entire horizontal extent of the work area at a velocity sufficient to entrain the welding fumes generated at the plurality of horizontally spaced welding work stations and move the fumes downwardly into the exhaust chamber for exhaust by the exhaust means.

In the disclosed embodiment of the invention methodology, the velocity of the air moving downwardly in the work chamber is determined by selectively varying the rate at which pressurized air is delivered to the plenum chamber, the setting of the ceiling vent means, the setting of the floor vent means, and the rate at which air is exhausted from the exhaust chamber. More specifically, the various parameters are adjusted to provide a downward air velocity within the work chamber between 3 and 6 feet per second.

According to another aspect of the invention methodology, the welding operation comprises a gas shielded welding operation in which an arc is struck between a welding apparatus and the work to be welded and the arc is surrounded by a shield of an inert gas to prevent degradation of the weld, the welding is performed in an enclosure, and air is moved downwardly within the enclosure over the welding location at a velocity sufficient to entrain and downwardly exhaust the fumes generated in the welding process but insufficient to disturb the gas shield around the arc. This methodology allow effective welding fume removal in association with a gas shielded welding operations.

BRIEF DESCRIPTION OF THE DRAWINGS

FIG. 5 is a somewhat schematic view illustrating an aspect of the invention methodology;

FIG. 6 is a detail view taken within the circle 6 of FIG. 3;

FIG. 7 is a detail view looking in the direction of the arrow 7 in FIG. 6; and

FIG. 8 is a detail view of floor vent means utilized in the invention welding enclosure assembly.

DETAILED DESCRIPTION OF THE PREFERRED EMBODIMENT

Figure 2:
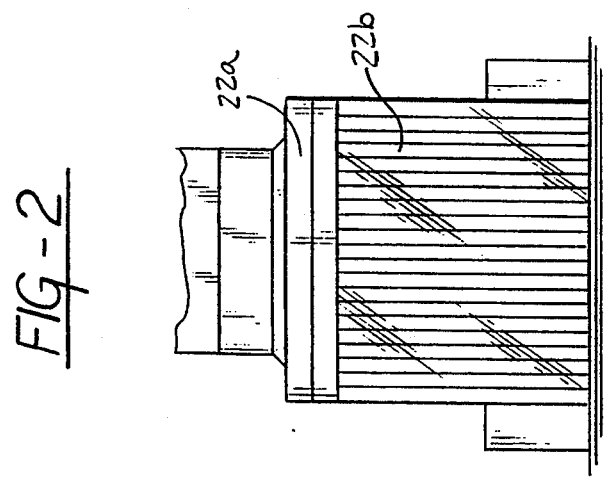
FIG. 2 is an end view of the welding enclosure assembly of FIG. 1.
Figure 1:
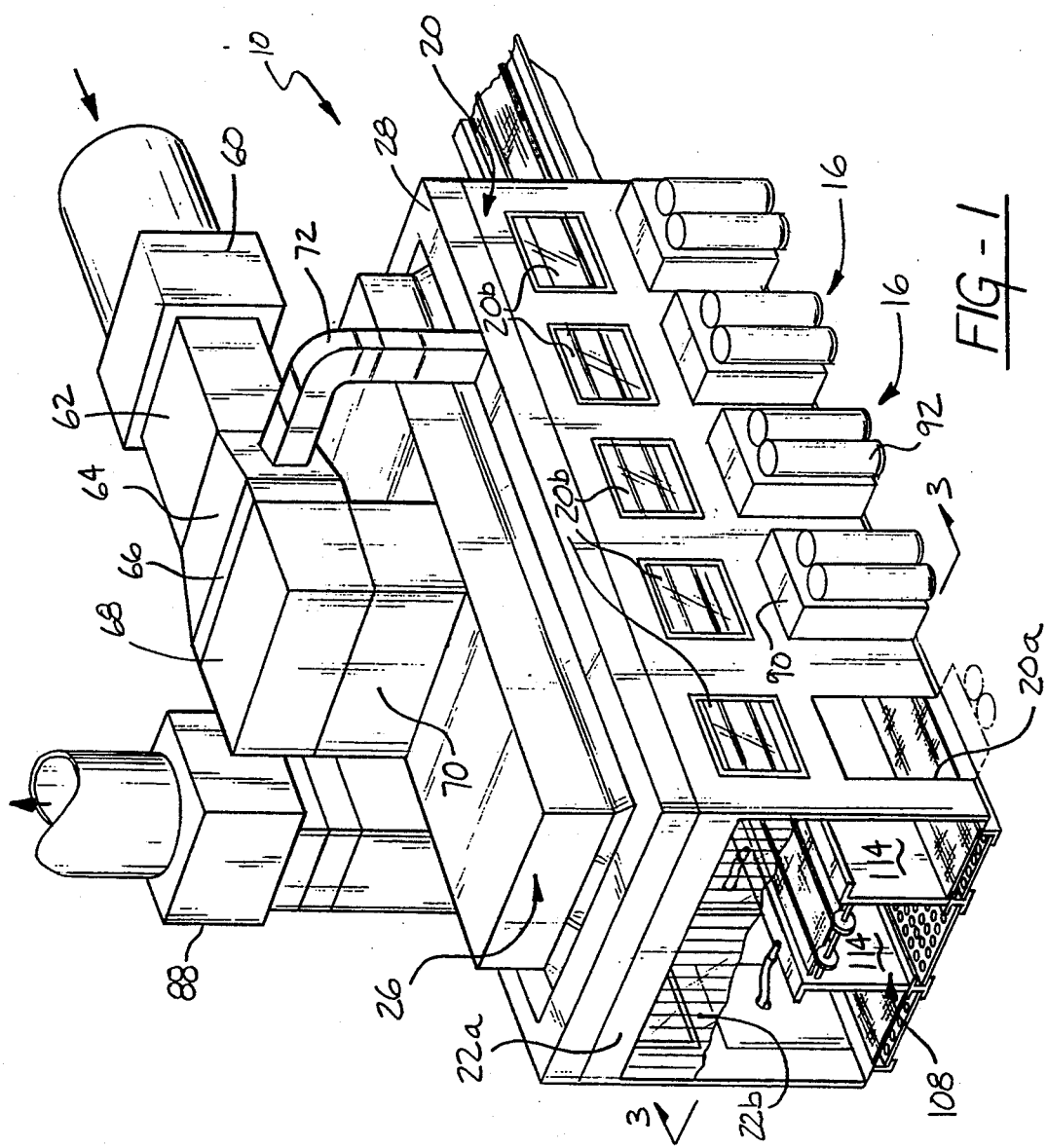
FIG. 1 is a perspective view of a welding enclosure assembly according to the invention.
Figure 3:
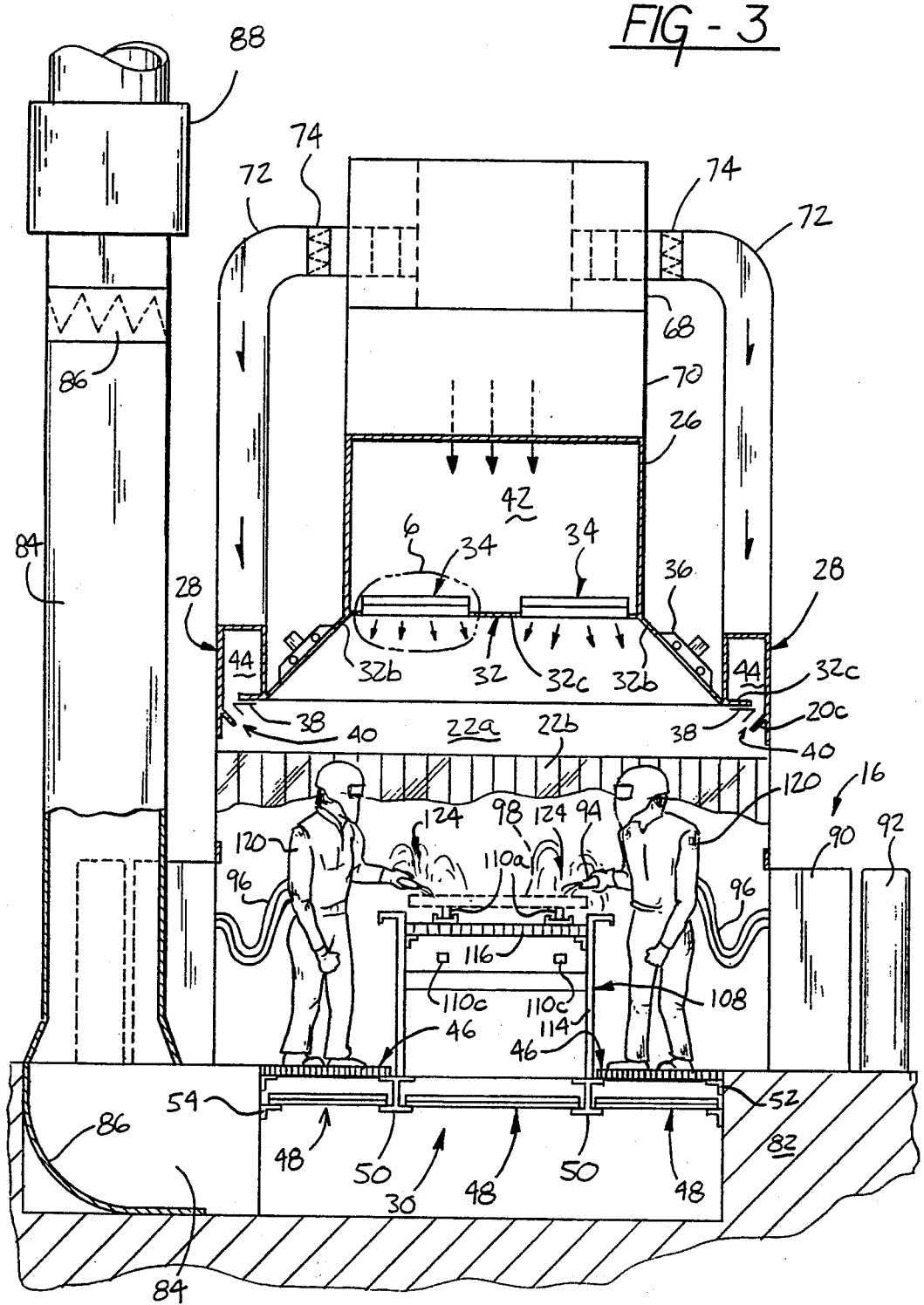
FIG. 3 is a cross sectional view taken on line 3—3 of FIG. 1.
Figure 4:
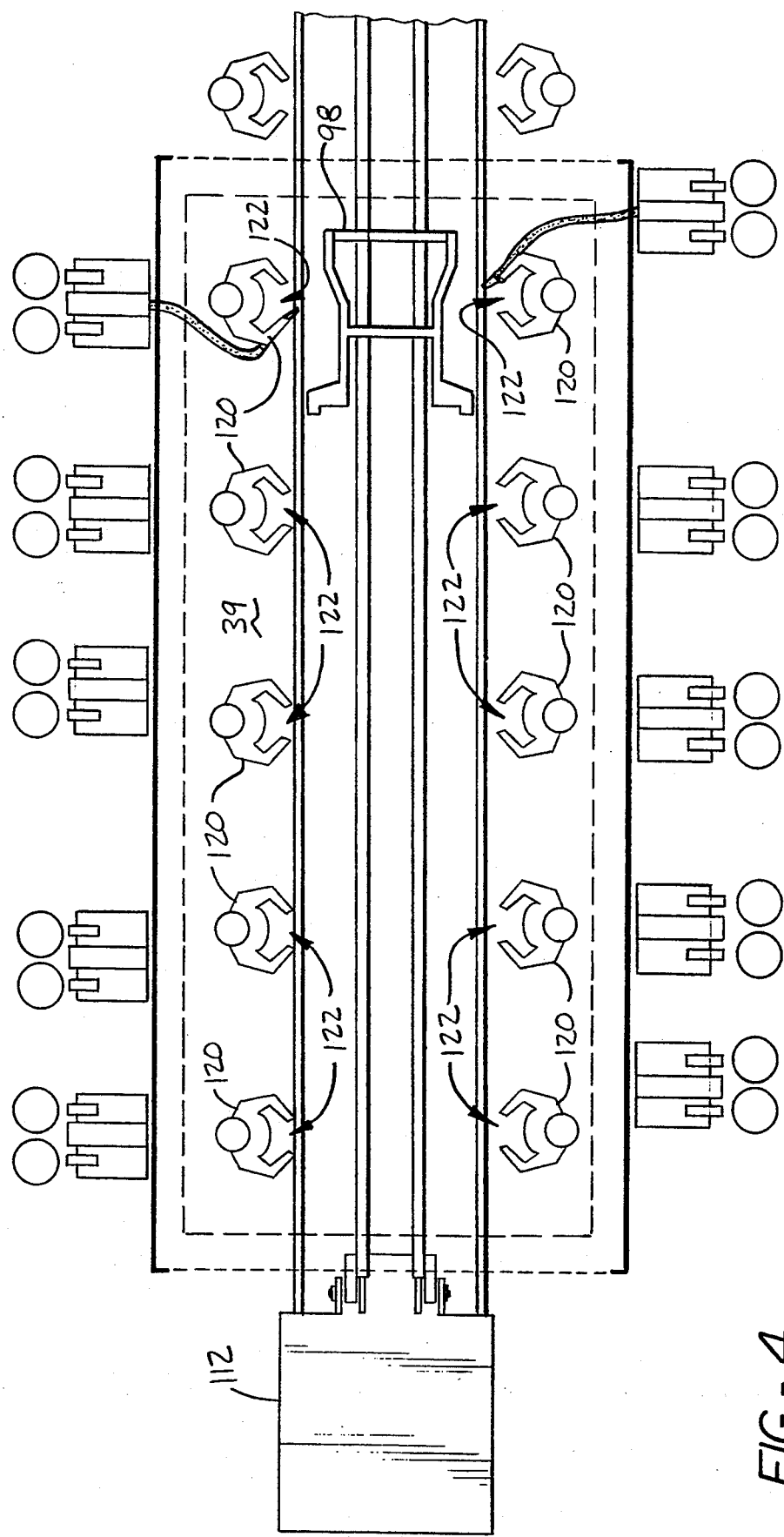
FIG. 4 is a somewhat schematic plan view of the invention welding enclosure assembly.

The invention is directed to providing effective welding fume removal in a large scale welding operation in which welding is performed at a plurality of horizontally spaced welding work station within a central work chamber and in which fume removal is accomplished over the entire horizontal area of the work chamber so that welding operations may be performed at any location over the horizontal area of the work chamber.

The invention welding enclosure assembly includes a booth 10, air supply means 12, air exhaust means 14, a plurality of welding apparatus 16, and work handling means 18. The assembly, unless otherwise indicated, is fabricated utilizing sheet metal and other ferrous products.

Booth 10 has a generally rectangular prismatic configuration and may, for example, have a length of 37 feet and a width of 14 feet. Booth 10 includes side walls 20, end curtain assemblies 22, a ceiling assembly 24, a central plenum 26, a peripheral plenum 28, and a floor assembly 30.

Side walls 20 are formed of sheet metal and each includes a plurality of longitudinally spaced openings 20a and a plurality of longitudinally spaced windows 20b positioned over the respective openings 20a.

Each end curtain assembly 22 includes an arch 22a and a curtain comprising a plurality of hanging fabric or plastic strips 22b which coact to effectively close the end of the booth but which readily part to allow ingress and egress to the booth by personnel or by materials.

Ceiling assembly 24 includes a ceiling 32, central registers 34, lights 36, and peripheral registers 38.

Ceiling 32 has a truncated pyramidal configuration and includes angled side portions 32a, edge portions 32b and a central portion 32c. Registers 34 are positioned in openings in ceiling central portion 32c. Each register may have a dimension for example of 24 inches by 36 inches with the 36 inch dimension arranged transversely of the booth, and the registers may be arranged in two parallel rows of registers extending for the entire length of the booth with, for example, 12 equally spaced registers in each row.

Side walls 20, ceiling 32, end curtain assemblies 22, and floor assembly 30 coact to define a central work chamber 39 extending the full length and width of the booth.

Each register 34 (as best seen in FIGS. 6 and 7) includes three stacked air control levels including an upper level defined by pairs of pivotally mounted vanes 34a extending longitudinally of the booth and coacting to selectively open or close off the upper end 34b of the register; an intermediate level comprising a plurality of pivotally mounted vanes 34c extending transversely of the booth and coacting to define the fore and aft direction of the air flowing downwardly through the upper vanes 34a; and a lower level comprising a plurality of longitudinally extending vanes 34c coacting to determine the lateral direction of the air flowing downwardly through the vanes 34a and the vanes 34c.

Lights 36 may take any known form and are positioned in longitudinally spaced relation along each angled ceiling portion 32b so as to provide adequate illumination for the booth.

Peripheral registers 38 are positioned respectively below ceiling edge portions 32c and coact with the edge portions 32c and with lips 20c defined along the upper edge of each side wall 20 to define an elongated narrow slot 40 extending along each upper longitudinal edge of the booth interior.

Central plenum 26 is formed of sheet metal, is positioned generally over central ceiling portion 32c, and extends the entire length of the ceiling portion 32c to define a plenum chamber 42 overlying the central ceiling portion 32 and thereby overlying the registers 34.

Peripheral plenum 28 extends entirely around the upper perimeter of the booth to define a closed loop peripheral plenum chamber 44.

Floor assembly 30 includes a plurality of steel grates 46 and a plurality of perforated assemblies 48. Grates 46 are positioned along central structural I-beams 50 and angle irons 52 and are arranged along the entire length of the booth in two laterally spaced parallel rows of grates.

Perforated assemblies 48 are arranged below grates 46 in three parallel rows extending the entire length of the booth with the outboard rows supported by I-beams 50 and angle irons 54 and the central or inboard row supported by I-beams 50.

As best seen in FIG. 8, each perforated assembly includes upper and lower sheets 56 and 58 arranged in superposed relation and each including parallel rows of apertures 56a, 58a. Upper and lower sheets 56, 58 are arranged to be slid longitudinally relative to each other so as to vary the extent to which the upper apertures 56a coincide with the lower apertures 58a and thereby vary the size of the openings or apertures defined by the coaction of the apertures 56a/58a.

Air supply means 12 includes a blower 60; a horizontal conduit 62 arranged to receive the output of blower 60; a transition conduit 64; a damper 66; a box conduit 68; a further box conduit 70; peripheral conduits 72; and peripheral conduit dampers 74.

Blower may for example comprise a centrifugal fan available from Hartzel Fan, Inc. of Piqua, Ohio as Part No. 54BA and sheaved to operate at 36000 CFM capacity.

Box conduit 70 opens at its lower end in the upper end of central plenum 36 and conduits 62 64, 68 and 70 coact to define conduit means extending from the outlet of the blower 60 to the inlet to the plenum chamber 42.

Peripheral conduits 72 extends from opposite sides of expansion conduit 64 and communicate at their lower ends with diametrically opposed locations on peripheral plenum 28 so that conduits 62, 64, and 72 coact to define conduit means extending from the blower 60 to diametrically spaced points on the peripheral plenum 28.

Damper 66 and dampers 74 may for example comprise heavy duty industrial type opposed blade control dampers of the manually operable hand quadrant type available from Ruskin Manufacturing Co. of Grandview, Mo. as Part No. CD82AF3.

Air exhaust means 14 includes a pit or exhaust chamber 80, a lateral conduit 81, a vertical stack conduit 84, a damper 86, and an exhaust fan 88.

Pit or exhaust chamber 80 runs the entire length of the booth and underlies the grates 46 and the perforated assemblies 48. Pit 80 may be formed for example as an integral recess or well in the foundation structure 82 underlying the booth.

Lateral conduit 81 communicates with pit 80 at an intermediate location along one side edge of the pit 80 and may also be formed as an integral well in the foundation structure 82 with an arcuate baffle sheet 86 positioned to direct the air flowing laterally outwardly from pit 80 upwardly into vertical stack conduit 84.

Vertical stacked conduit 84 is positioned in overlying relation to the outlet of lateral conduit 81 and is connected at its upper end to the intake of exhaust fan 88.

Exhaust fan 88 may comprise for example a centrifugal fan available from Hartzel Fan, Inc. of Piqua, Ohio as Part No. 54BA and sheaved to operate at 37000 CFM capacity.

Damper 86 is interposed in vertical stack conduit 84 adjacent blower 88 and may correspond generally to dampers 66 and 74.

Each welding apparatus 16 is positioned in a respective opening 20a in a side wall 20 of the booth and includes a central welder housing 90 sized to fit within opening 20a, a pair of wire spools 92, and a welding torch 94 connected to the welder 16 via a supply assembly 96. Each welding apparatus may comprise for example an apparatus available from Miller Welding of Appleton, Wis. as Part No. 650.

Each welding apparatus 16 is intended to perform a gas shielded welding operation in which, as best seen in FIG. 5, an arc is suitably struck between the welding torch or nozzle 94 and the work (for example an automobile frame 98) and the arc is surrounded by a shield of an inert gas to prevent degradation of the weld. Specifically, the arc 100 is struck from a filler wire 102 fed from a reel 92 through a hollow nozzle 94 and inert gas such as argon or helium is passed through the nozzle 94 around the filler wire 102 and emerges at the nozzle outlet 94a to form a gas shield or envelope 104 in surrounding relation to the arc 100 and extending substantially from the nozzle outlet to the location of the weld 106. It will be understood that the inert gas shield or envelope 106 protects the metal in transfer across the arc thus providing weld metal of substantially the same composition as the filler metal. It will further be understood that the arc may be struck directly between the filler metal, serving as electrode, and the work to be welded or a separate tungsten electrode may be provided to establish the arc between the tungsten electrode and the work to be welded. In either case, a shield or envelope of inert gas such as argon or helium is projected around the electrode and around the arc protection for the arc.

Work handling assembly 18 includes a bench or table 108, a conveyor 110, and a chute 112.

Bench or table 108 is positioned centrally within the booth in overlying relation to pit 80 and extends the full length of the booth. Bench 108 includes laterally spaced side rails or walls 114 and a plurality of grates 116 suitably positioned between the side rails 114 proximate the upper ends of the rails.

Conveyor 110 includes upper runs 110a running along the upper face of the grates 116, drive sprockets 110b, and lower or return runs 110c running along the underface of the grates 116. It will be understood that conveyor 110 is operative to move a part to be welded such as a frame 98 through the booth 10 along the upper face of the grates 116 so that a plurality of welders 120 positioned at longitudinally spaced work stations 122 on either side of the table 108 may perform successive welding operations on the frame as the frame is moved along the table 108.

For example, and as shown, ten welders may be positioned within the booth with five welders occupying longitudinally spaced work stations 122 on each side of the table so that, as the frame 98 is moved through the booth on the conveyor 110, a series of welding operations may be performed on both sides of the frame by the successive welders positioned along the opposite sides of the table with each welder 120 utilizing a separate welding apparatus 16 positioned proximate the respective work station to which the respective welder is assigned but with the welder at each work station free to move up and down the line along the length of the table to accomplish a specific weld as the frame moves past the work station so that the ten welders, in combination, may perform welding operations at any longitudinal location within the work station on either side of the table.

Chute 112 is positioned outside of the booth and is arranged to receive the welded frames 98 as they are discharged from the booth through the curtain 22 by the conveyor 110.

In operation, the various parameters of the welding enclosure assembly are adjusted to establish a substantially laminar downward flow of air over substantially the entire horizontal area of the booth at a velocity sufficient to entrain the welding fumes 124 generated at the several work stations 122 and move the fumes downwardly to the exhaust chamber 80 for exhaust through the lateral conduit 84 and vertical stack conduit 85. It is critical that the air moving downwardly within the work chamber defined by the booth move at a predetermined velocity that is sufficient to entrain the hot, naturally rising welding fumes and move the welding fumes downwardly out of the work chamber and yet which is insufficient to disturb the inert gas shield 104 formed around the arc 100 generated by each welding nozzle 94.

It has been found, for example, that the air should ideally be moved downwardly in the work chamber;at a velocity of between 3 and 6 feet per second with an ideal velocity of approximately 4 feet per second. This downward flow of air at this carefully maintained velocity must be provided over substantially the entire horizontal area of the booth so that the welders 120 may perform welding operations anywhere within the booth with the assurance that the fumes generated by the welding operation will be moved vertically downwardly out of the booth and with the further assurance that the downward air flow will not disturb the delicate gas shield established around the arc at each welding location.

It will be apparent that the establishment of the desired predetermined air flow velocity over substantially the entire horizontal area of the booth involves a careful adjusting and balancing of many parameters such as the cubic feet per minute air output of the blower 60, the settings of the dampers 66 and 74, the settings of the registers 34, the settings of the registers 38, the settings of the perforated assemblies 48, the setting of the damper 86, and the cubic feet per minute capacity of the exhaust fan 88.

In overview, it will be seen that the air moving downwardly within the work chamber is provided primarily through the registers 34 from the central plenum chamber 42 with this air supplemented by a thin side curtain of air moving downwardly through conduits 72 and through peripheral plenum 28 for discharge through slit apertures 40. As one operating example, and with the blower 62 operating at its capacity of 36,000 cubic feet per minute and exhaust fan 88 operating at its capacity of 37,000 cubic feet per minute, the system may be adjusted so that 27,000 cubic feet per minute is delivered to box conduit 70 for delivery to central plenum 26; 4,500 cubic feet per minute is delivered to each conduit 72 for delivery to peripheral plenum 28 so that 36,000 cfm is delivered to central work chamber 39 for downward flow through the work chamber; and approximately 1,000 cubic feet per minute is infiltrated or drawn into the booth from the exterior booth environment to provide 37,000 cubic feet per minute of air moving through the floor assembly for discharge through the vertical stack conduit 84 under the pull of exhaust fan 88.

Under these operating conditions it has been found that a positive pressure of approximately plus three inches of water is maintained in plenum chamber 42 and a vacuum or negative pressure of approximately minus three inches of water is maintained in pit 80. Normally the outboard vanes of the vanes 34d of the registers 34 would be inclined as seen in FIG. 6 to deflect air in an outboard direction so as to provide downward air flow over substantially the entire surface area of the work chamber. Further, the vanes 34a of the registers 34 proximate the box conduit 70 would normally be maintained in a relatively closed position as compared to the vanes 34a of the registers proximate the ends of the booth so as to provide a relatively uniform distribution of the incoming air from box conduit 70 downwardly through the various registers. Similarly, the perforated assemblies 48 directly underlying the box conduit 70 would normally be adjusted to a relatively restricted position as compared to the perforated assemblies proximate the ends of the booth so as to again provide a uniform flow of air over the entire surface area of the booth. Further adjustment of the air flow is provided by manual adjustment of dampers 66, 74 and 86.

The net result of all the adjustments is to establish a steady substantially laminar downward flow of air over substantially the entire horizontal area of the booth at a velocity sufficient to entrain the welding fumes generated at the various welding work stations but insufficient to disturb the gas shield around the arcs at the work stations. Downward entrainment of the welding fumes precludes the fumes from ever rising upwardly and entering beneath the helmets 130 of the welders 120 so that the fumes are precluded from entering the respiratory and vision zones of the welders. As a result, the welders may work longer periods of time without relief and the welders overall health prospects are substantially improved by eliminating exposure to the welding fumes.

Whereas a preferred embodiment of the invention has been illustrated and described in detail it will be apparent that various changes may be made in the disclosed embodiment without departing from the scope or spirit of the invention.

I claim:

1. A welding assembly to facilitate a welding operation in which welding fumes are generated, said assembly comprising:
    means establishing a welding enclosure having a ceiling overlying the welding operation and having vent means to allow passage of air downwardly through the ceiling and a floor underlying the welding operation and having vent means to allow passage of air downwardly through the floor; and
    means operative to establish a positive air pressure in a region above the ceiling and a negative air pressure in a region below the floor so as to establish a continuous downward flow of air within the enclosure from the ceiling to the floor at a velocity sufficient to entrain the welding fumes and move the fumes downwardly through the vent means in the floor for exhaust from the enclosure.

2. A welding assembly according to claim 1 wherein:
    the operative means includes a plenum overlying the ceiling establishing the region above the ceiling, a blower for delivering pressurized air to the plenum, an exhaust chamber beneath the floor establishing the region below the floor, and an exhaust fan communicating with the exhaust chamber.

3. A welding enclosure according to claim 2 wherein:
    the operative means further includes means for varying the setting of the vent means in the ceiling.

4. A welding assembly according to claim 3 wherein:
    the operative means further includes means for varying the setting of the vent means in the floor.

5. A welding enclosure assembly comprising:
    a central work chamber;
    means defining a plurality of horizontally spaced welding work stations within the central work chamber;
    an exhaust chamber beneath and generally coextensive with the central work chamber;
    a floor over the exhaust chamber, underlying and substantially coextensive with the central work chamber, and including vent means operative to allow air to pass through the floor between the central work chamber and the exhaust chamber;
    exhaust means operative to establish a negative air pressure in the exhaust chamber and operative to exhaust air from the exhaust chamber;
    a plenum chamber overlying the central work chamber;
    means for establishing a positive air pressure in the plenum chamber;
    a ceiling over and substantially coextensive with the central work chamber, underlying the plenum chamber, and including vent means operative to pass air downwardly through the ceiling from the plenum chamber into the central work chamber for passage downwardly through the central work chamber through the floor vent means into the exhaust chamber and into the exhaust means; and means establishing side boundaries at opposite sides of the central work chamber impeding the lateral escape of the air passing downwardly through the central work chamber;

the various parameters of the enclosure assembly being selected to establish a steady, substantially laminar downward flow of air over substantially the entire horizontal area of the central work chamber at a velocity sufficient to entrain the welding fumes generated at the plurality of horizontally spaced welding work stations and move the fumes downwardly to the exhaust chamber for exhaust through the exhaust means.

6. A welding enclosure assembly according to claim 5 wherein:

the side boundaries of the central work chamber comprise peripheral side walls which coact with the floor and the ceiling to define a substantially enclosed central work chamber.

7. A welding enclosure assembly according to claim 5 wherein:

the means for establishing a positive air pressure in the plenum chamber includes a blower arranged to deliver its output to the plenum.

8. A welding enclosure assembly according to claim 7 wherein:

the exhaust means includes an exhaust conduit communicating with the exhaust chamber and an exhaust fan communicating with the exhaust conduit;

the blower is operative to deliver a first predetermined cfm of air to the enclosure;

the exhaust fan is operative to remove a second predetermined cfm of air from the enclosure;

the first predetermined cfm is less than the second predetermined cfm; and the side boundaries are operative to allow the ingress of air into the work chamber in a quantity to match the difference between the first and second cfms.

9. A welding enclosure assembly according to claim 5 wherein:

the ceiling vent means includes supply air registers having variable settings.

10. A welding enclosure assembly according to claim 9 wherein:

the variable settings allow the direction of the downward flow of air into the work chamber to be varied.

11. A welding enclosure assembly according to claim 9 wherein:

the variable settings allow the volume of the downward flow of air into the work chamber to be varied.

12. A welding enclosure assembly according to claim 5 wherein:

the floor vent means includes exhaust air registers having variable settings.

13. A welding enclosure assembly according to claim 5 wherein:

the floor includes grates which define the floor and also provide floor vent means.

14. A method of removing welding fumes from a welding work area comprising the steps of:

providing a plurality of horizontally spaced welding work stations within the work area;

providing peripheral side walls to enclose the work area;

providing a ceiling over the work area;

providing a plenum chamber over the ceiling;

providing a floor under the work area;

providing an exhaust chamber under the floor;

delivering pressurized air to the plenum chamber;

exhausting air from the exhaust chamber;

providing vent means in the ceiling and in the floor; and adjusting the vent means, the delivery of pressurized air to the plenum chamber, and the exhausting of air from the exhaust chamber to create a positive air pressure in the plenum chamber and a negative air pressure in the exhaust chamber so that air flows downwardly through the work area from the plenum chamber to the exhaust chamber over substantially the entire horizontal extent of the work area at a velocity sufficient to entrain the welding fumes generated at the plurality of horizontally spaced welding work stations and move the fumes downwardly into the exhaust chamber for exhaust by the exhaust means.

15. A method according to claim 14 wherein:

the velocity is determined at least in part by selectively varying the setting of the ceiling vent means.

16. A method according to claim 14 wherein:

the velocity is determined at least in part by selectively varying the setting of the floor vent means.

17. A method according to claim 14 wherein:

the velocity is determined at least in part by varying the rate at which pressurized air is delivered to the plenum chamber.

18. A method according to claim 14 wherein:

the velocity is determined at least in part by varying the rate at which air is exhausted from the exhaust chamber.

19. A method according to claim 14 wherein:

the velocity is determined by varying one or more variable selected from the group consisting of varying the rate at which pressurized air is delivered to the plenum chamber, varying the setting of the ceiling vent means, varying the setting of the floor vent means, and varying the rate at which air is exhausted from the exhaust chamber.

20. A method according to claim 19 wherein:

the velocity is determined by varying at least two of the variables in the group.

21. A method according to claim 19 wherein:

the velocity is determined by varying at least three of the variables in the group.

22. A method according to claim 19 wherein:

the velocity is determined by varying all of the variables in the group.

23. A method of performing a gas shielded welding operation in which an arc is struck between a welding apparatus and the work to be welded and the arc is surrounded by a shield of an inert gas to prevent degradation of the weld, characterized in that:

the welding is performed in an enclosure, pressurized air is delivered to an upper region of the enclosure above the welding location, air under negative pressure is exhausted from a lower region of the enclosure below the welding location, and air is moved downwardly within the enclosure over the welding location in response to the pressure differential between the upper region and the lower region at a velocity sufficient to entrain and downwardly exhaust the fumes generated in the welding process but insufficient to disturb the gas shield around the arc.

24. A method according to claim 23 wherein:
the air is moved downwardly over the welding location at a velocity of between three and six feet per second.

25. A method according to claim 24 wherein:
the air is moved downwardly over the welding location at a velocity of approximately four feet per second.

26. A method of performing a gas shielded welding operation in which an arc is established between a welding apparatus and the work to be welded and the arc is surrounded by a shield of an inert gas characterized in that:
the welding operation is performed in an enclosure;
air is moved downwardly within the enclosure past the welding operation at a velocity sufficient to entrain the fumes generated by the welding operation but insufficient to disturb the gas shield around the arc; and
the air and entrained fumes are moved downwardly to an exhaust location below the welding operation.

* * * * *